United States Patent [19]
Hwo et al.

[11] Patent Number: 5,847,051
[45] Date of Patent: Dec. 8, 1998

[54] BLOCK COPOLYMER COMPOSITION CONTAINING POLYPROPYLENE AND POLYBUTENE

[75] Inventors: Charles Chiu-Hsiung Hwo, Sugar Land; Michael John Modic; Mark Leonid Kasakevich, both of Houston, all of Tex.

[73] Assignee: Shell Oil Company, Houston, Tex.

[21] Appl. No.: 705,027

[22] Filed: Aug. 29, 1996

[51] Int. Cl.⁶ .................................................. C08L 53/02
[52] U.S. Cl. .............................. 525/98; 524/505; 524/451
[58] Field of Search .............................. 525/98; 524/505, 524/451

[56] References Cited

U.S. PATENT DOCUMENTS 4,772,657  9/1988  Akiyama et al. ........................ 524/504

*Primary Examiner*—Mark L. Warzel
*Attorney, Agent, or Firm*—Y. Grace Tsang

[57] ABSTRACT

The present invention relates to the addition of a poly-1-butene to a mixture of a styrene-diene block copolymer, a polypropylene homo(co)polymer, oil, and optionally a metallocene-made polyethylene and/or filler such as talc, to make a mixture suitable for making automotive parts, household goods, sporting goods, etc.

7 Claims, No Drawings

BLOCK COPOLYMER COMPOSITION CONTAINING POLYPROPYLENE AND POLYBUTENE

FIELD OF THE INVENTION

This invention relates to a polymeric blend of a styrene-diene block copolymer, a propylene homo(co)polymer, a poly-1-butene homo(co) polymer, a paraffinic oil, and optionally a metallocene-made polyethylene.

BACKGROUND OF THE INVENTION

It is known in the art that blends of styrene-diene block copolymer, polypropylene and mineral oil are not suitable for making certain automotive parts, household goods, etc. This is because such blends lack the required hardness and tensile strength. Polypropylene often causes unacceptable hardness; and oil often impairs the tensile and compression properties, although it reduces hardness.

Polyethylene(s) made with metallocene catalyst(s) have been added to the aforementioned three-component blends which result in blends with improved properties at room temperatures. However, at elevated temperatures the tensile properties and compression set are still not meeting the requirement for making certain automotive parts, household and sporting goods, etc.

Therefore, there remains a need for a blend comprising a styrene-diene block copolymer, a polypropylene homo(co) polymer, oil and optionally a metallocene-made polyethylene having required hardness and tensile for making certain automotive parts, household goods, sporting goods, etc.

SUMMARY OF THE INVENTION

The present invention relates to the addition of a poly-1-butene to a mixture of a styrene-diene block copolymer, a polypropylene homo(co)polymer, oil, and optionally a metallocene-made polyethylene and/or filler such as talc, to make a mixture suitable for making automotive parts, household goods, sporting goods, etc.

DESCRIPTION OF THE EMBODIMENTS

While the present invention is described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

The present invention is directed to a blend having (i) about 2–25 wt%, preferably about 5–20 wt %, more preferably about 6–9 wt %, of poly-1-butene polymer; (ii) about 10–60 wt %, preferably about 30–50 wt %, more preferably about 40–45 wt % of a styrene-diene block copolymer; (iii) about 5–20 wt %, preferably about 5–15 wt %, more preferably about 6–9 wt %, of a polypropylene homo(co) polymer; and (iv) about 30–50 wt %, preferably about 35–45 wt %, and more preferably about 40–45 wt % of paraffinic oil. Optionally, up to about 15 wt %, preferably about less than 10 wt %, more preferably about less than 5 wt % of a metallocene-made polyethylene, and/or a up to 50 wt %, preferably from about 15 wt % to about 50.0 wt %, more preferably from about 25 wt % to about 35 wt %, of a filler such as talc are also present in the mixture.

The present blends have a surprising balance of hardness, tensile strength, flexural modulus, 2% Secant modulus at both room temperature and elevated temperature in comparison to conventional blends of styrenic block copolymer, polypropylenes, and paraffic oil.

The polybutylene referred to herein is one butene-1 polymer containing from 80% preferably from 95% and more preferably from 97% by weight of isotactic portions. The weight average molecular weight may range from about 10,000 to about 1,000,000, determined by gel permeation Chromatography. Suitable poly-1-butene also have a density of from 0.875 to 0.925, preferably from 0.900 to 0.920 and most preferably from 0.910 to 0.915. Suitable poly-1-butenes have melt indices in the range of from 0.1 to 200, more preferably from 0.4 to 20, and most preferably from 1.0 to 5 dg/min, as determined by ASTM D-1238 Condition E, at 190° C. The intrinsic viscosity of the poly-1-butene may range from 0.07, preferably from 7 at 130° C. in "decalin" (decahydronaphthalene).

These poly-1-butene polymers including their methods of preparation, and their properties are known in the art. An exemplary reference containing additional information on polybutylene is U.S. Pat. No. 4,960,820 which is herein incorporated by reference.

A poly-1-butene polymer (PB) usable herein is either a butene-1 homopolymer or a copolymer or a terpolymer. If a butene-1 copolymer is used, the non-butene comonomer content is from 1 to 50 mole %, preferably from 1 to 30 mole % of either ethylene, propylene, or an alpha olefin having from 5 to 8 carbon atoms. The poly-1-butenes can be modified to increase surface activity by reaction with, for example, maleic anhydride.

Suitable poly-1-butenes can be obtained, for example, in accordance with Ziegler-Natta low-pressure polymerization of butene-1, e.g. by polymerizing butene-1 with catalysts of $TiCl_3$ or $TiCl_3$—$AlCl_3$ and $Al(C_2H_5)_2Cl$ at temperatures of 10–100° C., preferably 20–40° C., e.g. according to the process described in DE-A-1,570,353. It can also be obtained, for example by using $TiCl_4$—$MgCl_2$ catalysts. High melt indices are obtainable by further processing the polymer by peroxide cracking, thermal treatment or irradiation to induce scissions leading to a higher melt flow material.

Duraflex® DP0200, a polybutylene polymer produced by Shell Chemical Company, of Houston, Tex. is a particularly suitable polymer. This polymer is a homopolymer with a melt index of 2.0 g/10min. at 190° C. and 2.16 kg and a weight average molecular weight of 439,000.

The styrenic-diene block copolymers used herein include linear, star, radial, branched, multi-armed and functionalized block copolymers of monoalkenyl arene(s) and conjugated diene(s). These block copolymers are manufactured and sold by Shell Chemical Company as KRATON® thermoplastic polymers. A more detailed description of these types of polymers can be found, for example, in U.S. Pat. No. 3,935,338; particularly from col. 2, line 52 to col. 3, line 24. The disclosure of this patent is herein incorporated by reference.

As a specific aspect of the present invention, the present blend comprises a linear block copolymer which has at least two monoalkenyl arene blocks, preferably two polystyrene blocks, separated by a block of a saturated conjugated diene, preferably a saturated polybutadiene block.

Illustrative non-limiting examples of suitable block copolymers are the styrenic block copolymers commonly referred to as SBS (styrene-butadiene-styrene), SIS (styrene-isoprene-styrene), SEBS (styrene-ethylene-butylene-styrene or hydrogenated styrene-butadiene-styrene block copolymer), SEPS (styrene-ethylene-propylene-styrene or hydrogenated styrene-isoprene-styrene block copolymer) which are more clearly disclosed in U.S. Pat. No. 5,149,741. Most particularly preferred are the SEBS copolymers.

Particularly suitable polystyrene-saturated polybutadiene-polystyrene (S—EB—S) and polystyrene-saturated polyisoprene-polystyrene (S—EP—S) block copolymers comprise polystyrene endblocks having a number average molecular weight from 5,000 to 50,000 and saturated polybutadiene or saturated polyisoprene midblocks having a number average molecular weight from 20,000 to 200,000. The saturated polybutadiene blocks preferably have from 35 % to 55 % 1,2-configuration and the saturated polyisoprene blocks preferably have greater than 85 % 1,4-configuration.

The total number average molecular weight of the styrenic block copolymer is preferably from 30,000 to about 250,000 if the copolymer has a linear structure. Such block copolymers may have an average polystyrene content from 10% by weight to 40% by weight.

A S—EB—S block copolymer particularly useful in the present invention is available from the Shell Chemical Company and has a number average molecular weight of about 180,000 with polystyrene endblocks each having a number average molecular weight of about 29,000 and polystyrene content of 32% by weight.

These polymers may be prepared using cationic or anionic initiators. Such polymers may be prepared using bulk, solution or emulsion techniques. In any case, the polymer containing at least ethylenic unsaturation will, generally, be recovered as a solid such as a crumb, a powder, a pellet, or the like.

In general, when solution anionic techniques are used, conjugated diolefin polymers and copolymers of conjugated diolefins and alkenyl aromatic hydrocarbons are prepared by contacting the monomer or monomers to be polymerized sequentially with an organoalkali metal compound in a suitable solvent at a temperature within the range from about −150° C. to about 300° C., preferably at a temperature within the range from about 0° C. to about 100° C. Particularly effective anionic polymerization initiators are organo-lithium compounds having the general formula:

wherein R is an aliphatic, cycloaliphatic, aromatic, or alkyl-substituted aromatic hydrocarbon radical having from 1 to about 20 carbon atoms; and n is an integer of 1 to 4.

In addition to sequential techniques to obtain triblocks, tetrablocks, and higher orders of repeating structures, anionic initiators can be used to prepare diblocks of styrene-polydiene having a reactive ("live") chain end on the diene block which can be reacted through a coupling agent to create, for example, $(S—I)_x.Y$ or $(S—B)_x.Y$ structures wherein x is an integer from 2 to about 30, Y is a coupling agent, I is isoprene, B is butadiene and greater than 65 percent of S—I or S—B diblocks are chemically attached to the coupling agent. Y usually has a molecular weight which is low compared to the polymers being prepared and can be any of a number of materials known in the art, including halogenated organic compounds; halogenated alkyl silanes; alkoxy silanes; various esters such as alkyl and aryl benzoates, difunctional aliphatic esters such as dialkyl adipates and the like; polyfunctional agents such as divinyl benzene (DVB) and low molecular weight polymers of DVB. Depending on the selected coupling agent the final polymer can be a fully or partially coupled linear triblock polymer (x=2), i.e., S.I.Y.I.S; or branched, radial or star configurations.

The coupling agent, being of low molecular weight, does not materially affect the properties of the final polymer. DVB oligomer is commonly used to create star polymers, wherein the number of diene arms can be 7 to 20 or even higher.

It is not required in coupled polymers that the diblock units all be identical. In fact, diverse "living" diblock units can be brought together during the coupling reaction giving a variety of unsymmetrical structures, i.e., the total diblock chain lengths can be different, as well as the sequential block lengths of styrene and diene.

Since the number of S—EB or S—EB polymeric arms in a star polymer can be large, the number average molecular weights of star polymers within the invention can be much larger than those of linear S—EB—S or S—EP—S polymers, i.e., up to 500,000 or higher. Such higher molecular weight polymers have the viscosity of lower molecular weight linear polymers and thus are processable in spite of the high molecular weight.

The block copolymers are hydrogenated to improve weatherability and oxidation stability. In general, the hydrogenation or selective hydrogenation of the polymer may be accomplished using any of the several hydrogenation processes known in the prior art. For example the hydrogenation may be accomplished using methods such as those taught, for example, in U.S. Pat. Nos. 3,494,942; 3,634,594; 3,670,054; 3,700,633; and Re. 27,145, the disclosure of which patents are incorporated herein by reference. The methods known in the prior art and useful in the present invention for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising an iron group metal atom, particularly nickel or cobalt, and a suitable reducing agent such as an aluminum alkyl.

In general, the hydrogenation will be accomplished in a suitable solvent at a temperature within the range from about 20° C. to about 100° C. and at a hydrogen partial pressure within the range from about 100 psig to about 5,000 psig, preferably about 100 psig to 1,000 psig. Catalyst concentrations within the range from about 10 ppm (wt) to about 500 ppm (wt) of iron group metal based on total solution are generally used and contacting at hydrogenation conditions is generally continued for a period of time within the range from about 60 to about 240 minutes. After the hydrogenation is completed, the hydrogenation catalyst and catalyst residue will, generally, be separated from the polymer.

Paraffinic oils which may be used in the present composition should be capable of being melt-processed with the other components of the composition without degrading. An exemplary processing oil is a white mineral oil available under the trade designation Drakeol 34 from the Pennzoil Company Pennreco Division. Drakeol 34 has a specific gravity of 0.864–0.878 at 60° F., a flash point of 460° F., and viscosity of 370–420 SUS at 100° F. Suitable vegetable oils and animal oils or their derivatives may also be used as the processing oil.

The polypropylene which may be utilized in the present composition is a homo(co) polymer of propylene, which is semicrystalline having molecular weight in a range from about 200,000 to 1,500,000 and melt flow rate (ASTM D 1238 Condition "L") of 0.1 to 500. As a specific aspect of the present invention, an injection molding grade crystalline polypropylene, such as Polypropylene 5Al5 homopolymer (Melt flow rate 5 g/10 minutes, from Union Carbide Co.), is typically utilized.

The metallocene polyolefins are polyolefins produced with a metallocene catalyst as described in U.S. Pat. Nos. 4,701,432, 5,322,728, and 5,272,236. As a specific embodiment of the present invention, the metallocene polyolefins are polyethylenes produced with a metallocene catalyst. Such metallocene polyethylenes are available e.g. from Dow Chemical Company under the trademark AFFINITY or ENGAGE (ethylene/octene copolymers) and from Exxon Chemical Company under the trademark EXACT (ethylene/butene copolymers, ethylene/hexene copolymers, or ethylene/butene/hexene terpolymers). The metallocene polyethylenes have low crystallinity when ethylene is copolymerized with from 8% to 30% by weight of one or more α-olefin monomers having from 4 to 12 carbon atoms.

As a specific embodiment of the present invention, an ethylene/butene copolymer, an ethylene/hexene copolymer, an ethylene/butene/hexene terpolymer, an ethylene/1-octene copolymer, an ethylene/1-propene/1-octene terpolymer, and mixture thereof, made by a metallocene catalyst is used. As a more specific embodiment of the present invention, a metallocene-made low density polyethylene purchased from Dow Chemical Company identified as ENGAGE EG 8100, which is an ethylene-octene copolymer, is used when metallocene made polyethylene. As another more specific embodiment of the present invention, a metallocene-made low density polyethylene purchased from EXXON Chemical Company identified as EXACT™, is used when metallocene made polyethylene.

Metallocene catalysts, also referred to as constrained geometry catalysts, are characterized as having a single, stable chemical type rather than a volatile mixture of states as discussed for conventional Ziegler-Natta catalysts. This results in a system composed of catalyst positions which have a singular activity and selectivity. For this reason, metallocene catalyst systems are often referred to as "single site" owing to the homogeneous nature of them, and polymers and copolymers produced from them are often referred to as single site resins by their suppliers.

Generally speaking, metallocene catalysts are organometallic compounds comprising a metal coordination complex comprising a metal of groups 3–10 or the Lanthanide series of the Periodic Table of the Elements, preferably a metal of groups 3–6, and especially a metal of groups 4 and 5, such as hafnium, titanium, vanadium, or zirconium, and a delocalized pi-bonded moiety substituted with a constrain-inducing moiety, such as one or more cyclopentadieny ligands. A cocatalyst, such as but not limited to, oligometric methyl alumoxane is often used to promote the catalytic activity. By varying the metal component and the cyclopentadienyl ligand a diversity of polymer products may be tailored having molecular weights ranging from about 200 to greater than 1,000,000 and molecular weight distribution from 1.5 to about 15. The choice of co-catalyst influences the efficiency and thus the production rate, yield, and cost.

As a consequence of the single site system afforded by metallocenes, olefinic copolymers, such as ethylene/alpha-olefin copolymers, can be produced with each polymer chain having virtually the same architecture. Therefore, the copolymer chains produced from single site systems are uniform not only in chain length, but also in average comonomer content, and even regularity of comonomer spacing, or incorporation along the chain.

In contrast to Ziegler-Natta catalyst made polymers, these single site metallocene polymers are characterized as having a narrow MWD and narrow compositional distribution (CD). While conventional polymers have MWD's of about 3.5 to 8.0, metallocene-made polymers range in MWD from about 1.5 to about 2.5 and most typically about 2.0. MWD refers to the breadth of the distribution of molecular weights of the polymer chains, and is a value which is obtained by dividing the weight-average molecular weight by the number-average molecular weight. The low CD, or regularity of side branches chains along a single chain and its parity in the distribution and length of all other chains, greatly reduces the low MW and high MW "tails". These features reduce the extractables which arise from poor LMW control as well as improve the optics by removing the, e.g. linear, ethylene-rich portions which are present in conventional heterogeneous resins.

Thus, conventional Ziegler-Natta systems produce heterogeneous resins which reflect the differential character of their multiple catalyst sites while metallocene systems yield homogeneous resins which, in turn, reflect the character of their single catalytic site.

Another distinguishing property of single site catalyzed ethylene copolymers is manifested in their melting point range. The narrow CD of metallocenes produces a narrow melting point range as well as a lower Differential Scanning Calorimeter (DSC) peak melting point peak. Unlike conventional resins which retain a high-melting point over a wide density range, metallocene resin melting point is directly related to density. For example, an ethylene/butene copolymer having a density of 0.905 g/cc produced using a metallocene catalyst has a peak melting point of about 100° C., while a slightly lower density ethylene/butylene copolymer which was made using a conventional Ziegler catalyst reflects its heterogeneous nature with a melting point at about 120° C. DSC shows that the Ziegler resin is associated with a much wider melting point range and actually melts at higher temperatures despite its lower density.

As one specific embodiment of the present invention, the metallocene-made polyethylene is produced by polymerizing ethylene with an alpha-olefin having from 4 to 12 carbon atoms, optionally one or more other alpha-olefin(s) having from 3 to 12 carbon atoms, in the presence of metallocene catalysts which achieve a density from 0.860 to 0.930, particularly from about 0.860 to about 0.920, a molecular weight distribution of less than 4, particularly less than 3, and good distribution of ethylene and from about 0% to about 40%, particularly from about 8% to about 30%, by weight of an alpha-olefin comonomer having from 4 to 12 carbon atoms, and optionally from about 0% to about 40% by weight of one or more other alpha-olefin(s) having from 3 to 12 carbon atoms such as propylene. The metallocene-made polyolefins are produced as described in U.S. Pat. Nos. 5,322,728 and 5,272,236 which descriptions are incorporated by reference herein. Such metallocene polyolefins are available from Dow Chemical Company under the trademarks ENGAGE and AFFINITY (ethylene/octene copolymers) and from EXXON Chemical Company under the trademark EXACT (ethylene/butene copolymers).

The polymerization process for making the metallocene-made thermoplastics may be accomplished, although not limited to, at conditions well known in the prior art for Ziegler-Natta or Kaminsky-Sinn type polymerization reactions, that is, temperatures from 0 to 250° C. and pressures from atmospheric to 1000 atmospheres (100 MPa). Suspension, solution, slurry, gas phase or other process conditions may be employed if desired. A support may be employed but preferably the catalysts are used in a homogeneous manner. It will, of course, be appreciated that the active catalyst system, especially nonionic catalysts, form in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

The metallocene-made thermoplastic polymers usable herein can be either homopolymers or copolymers. If copolymers are used, they can be binary copolymers, ternary copolymers or terpolymers, or copolymers with 4 or more monomers; they can be random or block copolymers.

The filler used herein is any suitable filler which will enhance the mechanical properties of the blend especially at elevated temperatures. As a specific embodiment of the present invention, talc, a precipitated calcium carbonate, is used as a filler.

While the principal components of the present composition have been described in the foregoing, such composition is not limited thereto, and can include non-essential components. Exemplary materials which could be used as additional components would include, without limitation, pigments, antioxidants, stabilizers, surfactants, waxes, flow promoters, solvents, particulates, and materials added to enhance processability and pellet handling of the composition.

Blending of the components can be accomplished by melt compounding techniques. The method of combining the ingredients of the formulation is important. For example, in most cases, it is desirable to use a good mixing device which will give homogeneous blend.

As used herein, the "hardness" was determine according to ASTM D2240 after 10 seconds of resistance on the Shore A hardness scale. The hardness value is the average of five measurements taken at different locations around the 4 inch by 5 inch compression molded plaques.

As used herein, the term "tensile strength", TS, refers to the resistance of a material to being elongated as determined in accordance with ASTM D-1708 using 0.125 inch wide and 0.080 inch thick dumbbell samples that are cut from plaques. Plaques formed from a blend of a block copolymer and other materials such as, for example, a polypropylene, poly-1-butene, an extending oil and optionally a metallocene made polyethylene and/or talc, were compression molded. Tensile testing was performed on an MTS Model 1000 Test Machine utilizing a crosshead speed of 0.5 inch/min. As used herein, the term "elongation" refers to the percent extension of a material until breakage as determined in accordance with ASTM D-1708 as described above. The gap distance for the extensiometer was 1 inch. Tensile Strength TB (RT) was determined at room temperature, while Tensile Strength at TB (70) was determined at 70° C.

As used herein, the 2% Secant Modulus was determined also in accordance with ASTM D1708. 2% Secant modulus (RT) was determined at room temperature, whereas 2% Secant (70) was determined at 70° C.

As used herein, the term "flexural modulus" was determined according to ASTM D 790 using an Instron Tester Model 1123 with Specimens of dimensions of 1 inch by 3 inches were cut out of compression molded plaques for this test. Flexural modulus (RT) was determined at room temperature and flexural modulus (70) was determined at 70° C.

The invention will be illustrated by the following illustrative embodiments which are provided for illustration purpose only and are not intended to limit the scope of the instant invention.

ILLUSTRATIVE EMBODIMENTS

In the illustrative and comparison embodiments below, (i) an S—EB—S elastomer, Kraton G 1651 was blended in a Brabender batch mixer (200 gram capacity) at 300° F. and 60 RPM with (ii) a poly-1-butene, DURAFLEX® PB0200 available from Shell Oil Company, (iii) a white mineral oil, Drakeol 34, available from the Pennzoil Company Pennreco Division, (iv) a crystalline polypropylene having a melt flow index of 5g/10 minutes according to ASTM D1238, Condition L, (iv) optionally metallocene made polyethylene ENGAGE EG 8100 available from Dow Chemical Company or EXACT (TM) 4033 available from EXXON Chemical Company, (v) optionally talc Vicron 25-11 available from Specialty Minerals, Inc., to make a multicomponent blend. The compositions of the blends (wt % of blends) and physical properties of the blends are shown in Tables 1 through 5. The physical properties of the components are shown in Tables 6 through 11.

TABLE 1

Blend with PB DP8310 vs Blends with mPE

| Run # | KRA-TON G1651 | Oil | PP | Talc | PB DP8310 | mPE Engage EG8100 | mPE Exact EX4033 | Hardness Shore A | TB (RT) psi | FM(RT) psi | SM(RT) 2%, psi | TB(70° C.) psi | FM(70° C.) psi | SM(70° C.) 2% psi |
|---|---|---|---|---|---|---|---|---|---|---|---|---|---|---|
| CCH148 | 32.5 | 42.5 | 10 | — | 15 | — | — | 58.1 | 671 | 1351 | 473 | 98 | 375 | 139 |
| CCH149 | 32.5 | 42.5 | 10 | — | — | 15 | — | 46.2 | 812 | 633 | 265 | 12 | 226 | −12 |
| CCH150 | 32.5 | 42.5 | 10 | — | — | — | 15 | 51.9 | 1235 | 824 | 323 | 43 | 282 | 56 |

TABLE 2

Blend with PB0200 vs Blend with mPE

| Run # | KRA-TON G1651 | Oil | PP | Talc | PB DP0200 | mPE Engage EG8100 | mPE Exact EX4033 | Hardness Shore A | TB (RT) psi | FM(RT) psi | SM(RT) 2%, psi | TB(70° C.) psi | FM(70° C.) psi | SM(70° C.) 2% psi |
|---|---|---|---|---|---|---|---|---|---|---|---|---|---|---|
| CCH120 | 32.5 | 42.5 | 15 | — | 10 | — | — | 67.7 | 1552 | 3930 | 1100 | 408 | 1255 | 502 |
| CCH127 | 32.5 | 42.5 | 15 | — | — | 10 | — | 55.8 | 1069 | 1374 | 453 | 114 | 557 | 187 |

TABLE 3

Blend without PB vs Blend with PB Partially Replacing PP

| Run # | KRA-TON G1651 | Oil | PP | Talc | PB DP0200 | mPE Engage EG8100 | mPE Exact EX4033 | Hardness Shore A | TB (RT) psi | FM(RT) psi | SM(RT) 2%, psi | TB(70° C.) psi | FM(70° C.) psi | SM(70° C.) 2% psi |
|---|---|---|---|---|---|---|---|---|---|---|---|---|---|---|
| CCH119 | 42.5 | 42.5 | 15 | — | — | — | — | 57.4 | 690 | 1633 | 537 | 142 | 770 | 351 |
| CCH126 | 42.5 | 42.5 | 7.5 | — | 7.5 | — | — | 56.3 | 1080 | 1353 | 400 | 245 | 463 | 278 |

TABLE 4

Blend without PB vs Blend with PB Partially Replacing mPE

| Run # | KRA-TON G1651 | Oil | PP | Talc | PB DP0200 | mPE Engage EG8100 | mPE Exact EX4033 | Hardness Shore A | TB (RT) psi | FM(RT) psi | SM(RT) 2%, psi | TB(70° C.) psi | FM(70° C.) psi | SM(70° C.) 2% psi |
|---|---|---|---|---|---|---|---|---|---|---|---|---|---|---|
| CCH128 | 22.5 | 42.5 | 15 | — | — | 20 | — | 59 | 1045 | 1368 | 484 | 106 | 452 | 191 |
| CCH123 | 22.5 | 42.5 | 15 | — | 10 | 10 | — | 70.2 | 989 | 3344 | 1141 | 149 | 912 | 349 |

TABLE 5

Blends with Talcs - PB vs mPE

| Run # | KRA-TON G1651 | Oil | PP | Talc | PB DP0200 | mPE Engage EG8100 | mPE Exact EX4033 | Hardness Shore A | TB (RT) psi | FM(RT) psi | SM(RT) 2%, psi | TB(70° C.) psi | FM(70° C.) psi | SM(70° C.) 2% psi |
|---|---|---|---|---|---|---|---|---|---|---|---|---|---|---|
| CCH134 | 15.5 | 31 | 10 | 28 | 15.5 | — | — | 65.1 | 1182 | 1966 | 651 | 227 | 980 | 400 |
| CCH135 | 15.5 | 31 | 10 | 28 | — | 15.5 | — | 58.4 | 678 | 1304 | 467 | 12 | 686 | 75 |
| CCH136 | 15.5 | 31 | 10 | 28 | — | — | 15.5 | 65.6 | 1117 | 1709 | 646 | 21 | 903 | 90 |

Table 1 above shows that a blend with PB (Run #148) has better high temperature properties (TB 70° C.), FM (70° C.) and SM (70° C.) than those with mPE (Run #s 149 and 150), where TB is tensile break strength, FM is flexural modulus and SM is secant modulus at 2% Strain.

Table 2 above again shows a blend with another grade of PB (Run #120) gives higher mechanical properties both at room temperature (RT) and at 70° C. than that with mPE (Run #127).

Table 3 illustrates that when PP is partially replaced with PB (Run #126), the tensile break strength (TB) is increased and hardness is maintained. There is a slight decrease in flexural modulus and secant modulus.

Table 4 illustrates that when mPE in the blends is partially replaced with PB (Run #123), the tensile break strength (TB) at 70° C., Flexural Modulus (FM) at 70° C., and Secant Modulus (SM) at 70° C., are all increased (comprising Run #123 vs. Run #128).

Table 5 illustrates that when talc is blended to mixtures of Kraton, oil and PP along with PB or mPE, one can conclude that a blend with PB (Run #134) exhibits higher tensile break strength (TB) at 70° C., Flexural Modulus (FM) at 70° C., and Secant Modulus (SM) at 70° C., than those blends with mPE (Runs #135 and #136).

TABLE 6

PHYSICAL PROPERTIES - ENGAGE EG 8100

| PHYSICAL PROPERTIES | TEST METHOD | VALUES[1] |
|---|---|---|
| Density, gm/cc | ASTM D-792 | .87 |
| Mooney Viscosity, ML 1 + 4 @ 121° C. | ASTM D-1646 | 23 |
| Percent Comonomer, octene | Dow[2] | 24 |
| Melt Index, dg/min | ASTM D-1238 | 1 |
| Melt Flow Ratio, $I_{10}/I_2$ | ASTM D-1238 | 7.5 |
| Dow Rheology Index (DRI) | Dow[3] | 2 |
| Ultimate Tensile, psi (MPa) | ASTM D-638 | 1,500 (10.3) |
| 100% Tensile Modulus, psi (MPa) | ASTM D-638 | 350 (2.4) |
| Ultimate Elongation, % | ASTM D-638 | 800 |
| Hardness, Shore A | ASTM D-2240 | 75 |

TABLE 6-continued

PHYSICAL PROPERTIES - ENGAGE EG 8100

| PHYSICAL PROPERTIES | TEST METHOD | VALUES[1] |
|---|---|---|
| Brittleness Temperature, °C. | ASTM D-746 | <−76 |
| Flexural Modulus, 2% Secant, psi (MPa) | ASTM D-790 | 2,340 (16.1) |

[1]These are typical properties only, and are not to be regarded as sales specifications.
[2]Based on ASTM D-2238, Method B.
[3]A calculated value based on complex viscosity that expresses the relative influence of long chain branching on the extrudability of homogeneous (single site catalyst) polyolefins.

TABLE 7

PHYSICAL PROPERTIES - EXACT (TM) 4033

| Plastic Properties | ASTM Method | Units | Typical Values |
|---|---|---|---|
| Density | D-1505 | g/cm³ | 0.880 |
| Melt Index | D-1238 (E) | dg/min | 0.8 |
| Melt Flow Rate | D-1238 (L) | dg/min | 1.3 |
| Internal Haze[1] | D-1003 | % | 6 @ 50 mils |
| Peak Melting Point by DSC | Exxon Method | °F. (°C.) | 140 (60) |
| Flexural Modulus, 1% Secant | D-790 | psi (MPa) | 3300 (23) |
| Elastomeric Properties[1] | | | |
| Hardness | D-2240 | Shore A | 85 |
| | | Shore D | 30 |
| Mooney Viscosity ML (1 + 4) @ 125°C. | D-1646 | Torque Units | 28 |
| Ultimate Tensile[2], Die D Tensile Modulus | D-412 | psi (MPa) | 3000 (21) |
| at 100% Elongation | D-412 | psi (MPa) | 520 (4) |
| at 300 % Elongation | | | 720 (5) |
| Ultimate Elongation | D-412 | % | 620 |
| Tear Strength, Die C | D-624 | psi (MPa) | 350 (2) |
| Vicat Softening Point, 200 g | D-1525 | °F. (°C.) | 162 (72) |
| Brittleness Temperature | D-746 | °F. (°C.) | <−112 (<−80) |

TABLE 7-continued

PHYSICAL PROPERTIES - EXACT (TM) 4033

| Plastic Properties | ASTM Method | Units | Typical Values |
|---|---|---|---|
| Impact Properties[1] | | | |
| Notched Izod @ −40°C. | D-256 | ft-lbs/in (J/cm) | No Break |
| Instrumented Falling Weight Impact[3] Max Energy/Total Energy | | | |
| @ 23°C. | D-3763 | ft-lbs (J) | 37/59 (51/80) |
| @ −40°C. | | | 24/63 (33/86) |
| Chemical Resistance Properties[1] | | | |
| ESCR, Condition A, 10% lgepal solution, $F_0$ | D-1693 | hrs | >1000 |

[1]Compression molded specimens.
[2]Tensile properties determined using a type D die and a crosshead speed of 20 in/min.
[3]20 mm striker, 40 mm anvil span, and 4 m sec test speed.

TABLE 8

PHYSICAL PROPERTIES - DURAFLEX ® Polybutylene 0200
Typical Physical Properties*

| | ASTM Test Method | English | | Metric | |
|---|---|---|---|---|---|
| | | Unit | Value | Unit | Value |
| Melt index | D 1238, "E" | — | — | g/10 min. | 1.8 |
| Density | D 1505 | lb/ft³ | 57.1 | g/cm³ | 0.915 |
| Tensile strength, at yield | D 638 | psi | 2000 | kg/cm² | 140 |
| Tensile strength, at break | D 638 | psi | 4500 | kg/cm² | 320 |
| Elongation, at break | D 638 | % | 350 | % | 350 |
| Modulus, of elasticity | D 638 | psi | $3.5 \times 10^4$ | kg/cm² | $2.5 \times 10^3$ |
| Izod impact strength | D 256 | ft-lb/in | No break | cm-kg/cm | No break |
| Hardness, Shore | D 2240 | D Scale | 55 | D Scale | 55 |
| Environmental stress crack resistance | D 1693 | Hours | No Failure** | Hours | No failure** |
| Brittleness temperature | D 746 | °F. | 0 | °C. | −18 |
| Melting point, range | DTA | °F. | 255–259 | °C. | 124–126 |

*Compression molded samples, conditioned 10 days at 73° F.
**15,000 hours at 50° C., 10% Igepal C0630

TABLE 9

Shell Polypropylene 5A15
Typical Properties

| Property | Traditional units | SI units | ASTM Test |
|---|---|---|---|
| Melt flow | 5.0 g/10 min | 5.0 g/10 min | D 1238[1] |
| Tensile yield strength, at 50 mm/min | 5,200 psi | 36 MPa | D 638[2] |
| Tensile yield elongation, at 50 mm/min | 7% | 7% | D 638[2] |
| Flexural modulus (1% secant), at 1.3 mm/min | 230,000 psi | 1,590 MPa | D 790A[2] |
| Notched Izod impact strength, at 73° F. (23° C.) | 0.7 ft-lb/in | 37 J/m | D 256[2] |
| Hardness, Rockwell | R102 | R102 | D 785 |
| Heat deflection temp., at 66 psi (455 kPa) | 219° F. | 104° C. | D 648 |
| Vicat softening temp. | 305° F. | 152° C. | D 1525B |

[1]Condition 230/2.16
[2]Injection molded ASTM D 638 Type I specimen.

TABLE 10

DURAFLEX ® Polybutylene 8310
Typical Physical Properties

| Property | ASTM Test Method | English | | S.I. Unit | |
|---|---|---|---|---|---|
| | | Unit | Value | Unit | Value |
| Melt index (E) | D 1238 | — | — | g/10 min | 3.2 |
| Density | D 792 | lb/ft³ | 55.9 | gm/cc | 0.895 |
| Tensile yield | D 1708[1] | psi | 550 | MPa | 3.9 |
| 1% Secant flexural modulus | D 790 | psi | 13000 | MPa | 92.2 |
| Hardness, Shore | D 2240 | A Scale | 90 | A Scale | 90 |
| Hardness, Shore | D 2240 | D Scale | 25 | D Scale | 20 |
| Coefficient of expansion, at 30° C. to 70° C. | D 696 | in/in/°F. | $7.2 \times 10^{-5}$ | $K^{-1}$ | $1.32 \times 10^{-4}$ |
| Coefficient of friction | D 1894 | — | 1.1 | — | 1.1 |
| Melting point | DSC | °F. | 194 | °C. | 90 |
| Glass transition | DSC | °F. | −29 | °C. | −34 |
| Crystallinity | Wide angle X-ray | % | 34 | % | 34 |
| Softening point, ring and ball | E 28 | °F. | 241 | °C. | 116 |

[1]Microtensile specimens tested at a 0.5 inch/minute jaw separation speed on 0.066 inch thickness compression molded plaques.

TABLE 11

KRATON ® G1651 Polymer typical characteristics:

| | |
|---|---|
| Styrene/Rubber Ratio | 32/68 |
| Specific Gravity | 0.91 |
| Hardness, Shore A | 75 |
| Brookfield Viscosity (cps at 77° F. @ 10% in toluene) | 1500 |
| Tensile Strength, psi | 5000* |
| Elongation, % | 850* |
| 300% Modulus, psi | 925* |

*Tensile properties = ASTM D412, speed = 10"/min

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

I claim:

1. A polymeric composition consisting of:
   (i) from about 10.0 wt % to about 60.0 wt % of a block copolymer of monoalkenyl aromatic hydrocarbon and conjugated diene,
   (ii) from about 5.0 to about 20.0 wt % of a polypropylene,
   (iii) from about 30.0 wt % to about 50.0 wt % of a paraffinic oil, and
   (iv) from about 2.0 to about 25.0 wt % of a poly-1-butene polymer having a melt index of from about 0.1 to about 200 as determined by ASTM D-1238 Condition E at 190° C.

2. The polymeric composition as described in claim 1, wherein the composition consists of from about 30.0 to about 50.0 wt % of said block copolymer, from about 5 to about 15 wt % of said polypropylene, from about 35.0 to about 45.0 wt % of said paraffic oil, and from about 5.0 to about 20.0 wt % of said poly-1-butene.

3. The polymeric composition as described in claim 1, wherein the composition consists of from about 40.0 to about 45.0 wt % of said block copolymer, from about 6 to about 9 wt % of said polypropylene, from about 40.0 to about 45.0 wt % of said paraffinic oil, and from about 6.0 to about 9.0 wt % of said poly-1-butene; wherein said poly-1-butene has a melt index of from about 0.1 to about 5 dg/min. as determined by ASTM D-1238 Condition E at 190° C.

4. The polymeric composition as described in claim 1, wherein the composition consists of from about 30.0 to about 50.0 wt % of said block copolymer, from about 5 to about 15 wt % of said polypropylene, from about 35.0 to about 45.0 wt % of said paraffic oil, and from about 5.0 to about 20.0 wt % of said poly-1-butene.

5. An auto part made from a polymeric composition consisting of from about 40.0 to about 45.0 wt % of a block copolymer of monoalkenyl aromatic hydrocarbon and conjugated diene, from about 6 to about 9 wt % of polypropylene polymer, from about 40.0 to about 45.0 wt % of paraffinic oil, from about 6.0 to about 9.0 wt % of poly-1-butene having a melt index of from about 0.1 to about 5 dg/min. as determined by ASTM D-1238 Condition E at 190° C.

6. A polymeric composition consisting of:
   (i) from about 10.0 wt % to about 60.0 wt % of a block copolymer of monoalkenyl aromatic hydrocarbon and conjugated diene,
   (ii) from about 5.0 to about 20.0 wt % of a polypropylene,
   (iii) from about 30.0 wt % to about 50.0 wt % of a paraffinic oil,
   (iv) from about 2.0 to about 25.0 wt % of a poly-1-butene polymer having a melt index of from about 0.1 to about 200 as determined by ASTM D-1238 Condition E at 190° C., and
   (v) from about 0 wt % to about 15.0 wt % of a polyethylene made by a metallocene catalyst, and
   (vi) from about 0 wt % to about 50.0 wt % of talc.

7. The polymeric composition as described in claim 6, wherein the composition consists of from about 30.0 to about 50.0 wt % of said block copolymer, from about 5.0 to about 15.0 wt % of said polypropylene, from about 35.0 wt % to about 45.0 wt % of said paraffinic oil, from about 5.0 to about 20.0 wt % of said poly-1-butene, from about 0 wt % to about 10.0 wt % of said polyethylene, and from about 15.0 wt % to about 50.0 wt % of said talc.

* * * * *